455-5 AU 263 EX
E4819 OR 3,566,046

United States Patent

[11] 3,566,046

[72] Inventors Edward D. McCormick
Schenectady, N.Y.;
Frederick A. Hottes, Grand Junction, Colo.
[21] Appl. No. 755,614
[22] Filed Aug. 27, 1968
[45] Patented Feb. 23, 1971
[73] Assignee General Electric Company

[54] TWO-WAY AMPLIFIER FOR SINGLE-LINE TRANSMISSION

8 Claims, 8 Drawing Figs.

[52] U.S. Cl. ........ 179/170
[51] Int. Cl. ........ H04b 3/38
[50] Field of Search ........ 179/170, 170 (C)

[56] References Cited
UNITED STATES PATENTS
1,548,039 8/1925 Jammer ........ 179/170C
1,605,972 11/1926 Nyquist ........ 179/170
1,623,095 4/1927 Crisson et al. ........ 179/170
2,758,281 8/1956 Carleson ........ 179/170

*Primary Examiner*—Kathleen H. Claffy
*Assistant Examiner*—William A. Helvestine
*Attorneys*—John F. Ahern, Paul A. Frank, Vance A. Smith, Frank L. Neuhauser and Oscar B. Waddell

ABSTRACT: An amplifier employing a directional coupler and branching filter amplifies a plurality of signals having different frequencies and moving in different directions in a single transmission line or coaxial cable. The directional coupler couples the plurality of signals into and out of a plurality of amplifying branches and also provides power isolation between branches. The branching filter performs the function of separating the signals having different frequencies.

Hybrid coupler at one end, filter at other.

Inventors:
Edward D. McCormick,
Frederick A. Hottes,
by Paul A. Frank
Their Attorney.

Inventors:
Edward D. McCormick,
Frederick A. Hottes,
by Paul A. Frank
Their Attorney.

TWO-WAY AMPLIFIER FOR SINGLE-LINE TRANSMISSION

This invention relates to a two-way amplifier, and more specifically, to a two-way amplifier in a VHF information and data communication network.

In many of the present community antenna television and comparable networks, video and other data information signals are transmitted in a "forward" direction from a central station or head end to a plurality of remote communication response units. In networks such as those described and claimed in application Ser. No. 779,568, of E.D. McCormick, and assigned to the same assignee as the present application, information stored in the communication response units is transmitted in a "reverse" direction back to the central station. To preclude expensive duplications, both the forward and reverse moving signals are transmitted through the same medium which may be by way of example, a coaxial cable.

At high frequencies, the attenuation constant of transmission lines is approximately proportional to the square root of the frequency. To compensate for the loss characteristics of the transmission line in extended lines, network amplifiers are provided at predetermined intervals to provide the appropriate gain. As it may be convenient as stated in the aforementioned application to transmit all forward signals in the VHF band and the reverse signals in a band below television channel 2 of the VHF band, two-way amplifiers capable of amplifying signals in the above "frequency domains" are necessary.

Frequency domain is defined as a portion of the electromagnetic spectrum and is employed in that context hereafter. Other references used herein to frequency such as "high frequency" or "low frequency" have no reference to particular bands in the electromagnetic spectrum but are used merely as words of comparison.

At bridging junctions between a coaxial cable or the like and a plurality of feeder lines, it is often necessary to amplify both the signals moving through the trunk cable and the signals moving through the feeder lines. Thus, it is desirable to have a single amplifying device which effectuates all amplification in the trunk and feeder lines for both forward and reverse signals.

It is therefore a primary object of our present invention to provide a new and improved two-way amplifier for two-way communication functions on coaxial cable distribution networks.

It is another object of our present invention to provide a new and improved two-way amplifier for bridging amplification between trunk and feeder lines in two-way communication networks.

Briefly, in accordance with our present invention, we provide an amplifying device including a directional or hybrid coupling means and filtering means which separate and power isolate signals in different frequency domains for appropriate amplification. The device may be employed in conjunction with a coaxial cable or the like which is carrying signals in different frequency domains moving in forward and reverse directions. The novel features believed characteristic of the present invention are set forth in the appended claims. The invention itself, together with further objects and advantages thereof, may best be understood with reference to the following description taken in connection with the appended drawing in which:

FIG. 1 is a schematic diagram of one embodiment of the present invention;

FIGS. 2*a* through 2*d* are illustrations of frequency response diagrams of various components in a two-way amplifying device;

Figures 1, 2A, 2B, 2C, 2D, 3:
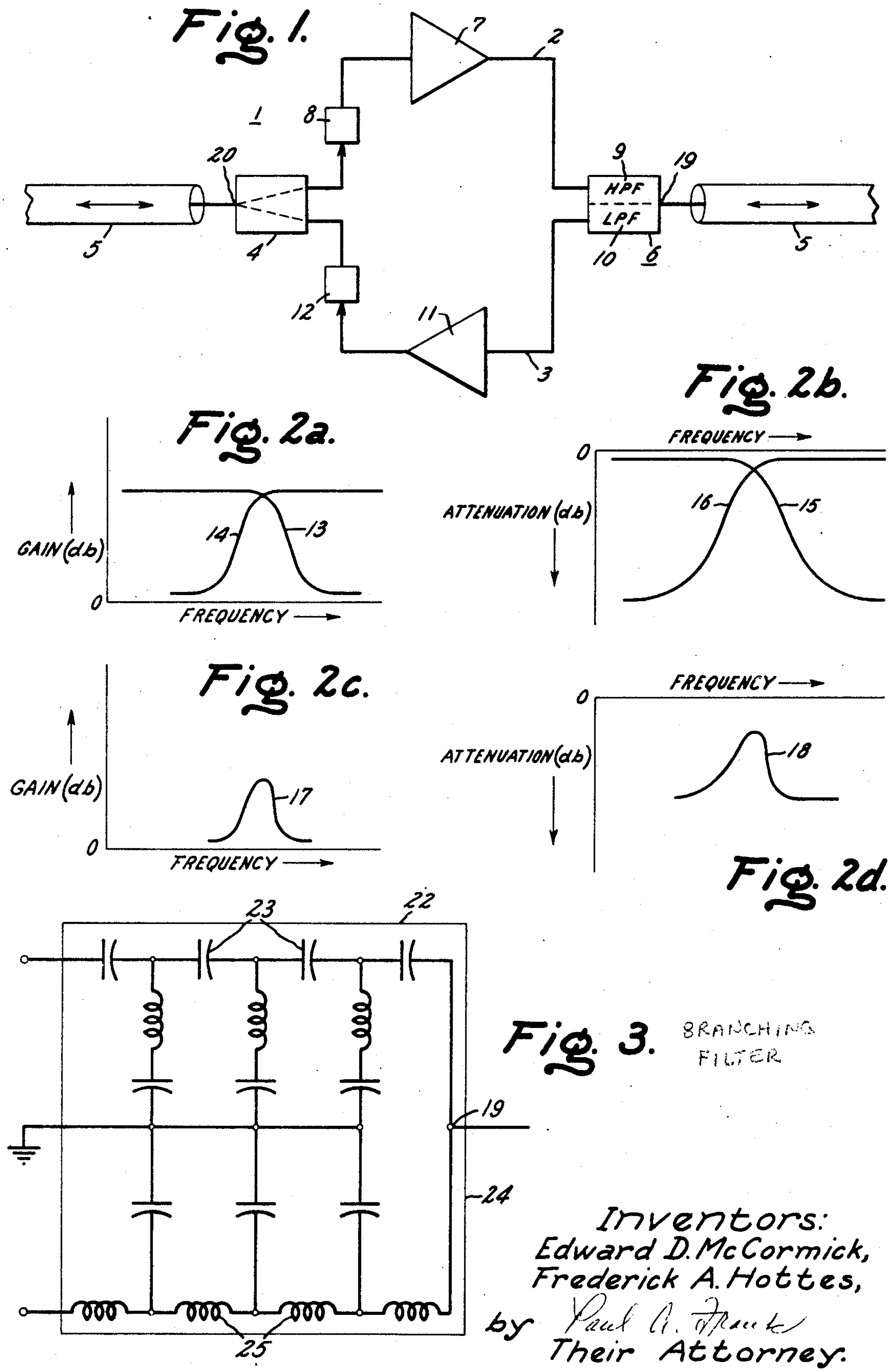
FIG. 3 is a schematic diagram of a typical branching filter.

FIG. 1 illustrates one embodiment of our present invention which takes the form of a diplex amplifier for extended service along a transmission medium. In this embodiment, the major components comprising diplex amplifier 1 are arranged in a bridgelike circuit. The upper and lower branches 2 and 3 are called the high and low frequency branches, respectively. Hybrid coupler 4 is coupled to coaxial cable 5 which may on this side of amplifier 1 lead to a central transmitting station (not shown). At the opposite end of diplex amplifier 1, branching filter 6 is coupled in the appropriate manner to coaxial cable 5 which may lead to a plurality of remote communication response units (not shown). One terminal of hybrid coupler 4 is connected to forward amplifier 7. Attenuation pad 8 may be employed to provide broad band match. Forward amplifier 7 is in turn connected to high pass filter portion 9 of branching filter 6. These components and connections constitute the high frequency branch 2 of the circuit.

The low frequency branch 3 comprises the low pass filter portion 10 of branching filter 6, reverse amplifier 11, attenuation pad 12, and hybrid coupler 4 via another terminal.

Thus, in operation, the forward moving signals in frequency domains which may occupy regions of the VHF band are coupled out of coaxial cable 5 into hybrid coupler 4. The signals move into forward amplifier 7, are given appropriate amplification, passed by the high pass filter portion 9 of branching filter 6, and reenter coaxial cable 5. Similarly, the reverse moving signals in frequency domains below that of the forward moving signals move into the low frequency branch via loss pass filter portion 10 of branching filter 6, are amplified by reverse amplifier 11 and reenter coaxial cable via hybrid coupler 4.

Because it is important in the operation of communication networks to utilize as much of the available frequency spectrum as possible, the frequencies of various signals may be spaced close together. Thus, in this probable situation, forward amplifier 7, reverse amplifier 11, high pass filter portion 9, and low pass filter portion 10 may have a common range of frequencies to which they respond.

FIG. 2*a* represents typical response curves of a forward and reverse amplifier amplifying signals in adjacent frequency domains. Thus, it is readily seen that response curve 13 of a reverse amplifier and response curve 14 of a forward amplifier partially overlap.

FIG. 2*b* discloses attenuation curves 15 and 16 which represent attenuation across the low and high pass portions of a branching filter. The point at which the curves intersect is sometimes known as the "crossover frequency."

When a branching filter is utilized in place of a hybrid coupler in the circuit of FIG. 1, there is an inherent risk that oscillation may occur due to the relative low power isolation at the crossover frequency. Low power isolation may result in a total power gain around the loop formed by the branches of the two-way amplifier. The total power gain may be represented by curve 17 of FIG. 2*c*. Another advantage realized by using a hybrid coupler as one element in the circuit is the minimization of envelope delay caused by branching filters.

A hybrid coupler, however, has the same power isolation across the entire band even at the crossover frequency. When the hybrid coupler is utilized as in FIG. 1, there is total power loss or attenuation around the loop. FIG. 2*d* illustrates via attenuation curve 18 the power loss. We have found it convenient to employ a hybrid coupler having approximately a 24 db isolation and obtainable from Craftsman Electronic Products under the number 2WDW-S-F.

A branching filter may be utilized which has suitable impedance matching at the "flanking point" 19 with the coaxial cable. We have also found it appropriate to employ branching filters having a power isolation greater than 40 db between high and low portions. The schematic of FIG. 3 discloses a typical LC branching filter 21 that may be employed to separate signals in high and low frequency domains. The high pass portion 22 usually consists of a plurality of capacitances 23 in series while the low pass portion 24 ordinarily comprises a plurality of inductances 25 in series. The values given to the various elements in the circuit largely depend upon the frequencies employed.

Because hybrid couplers ordinarily have a higher power loss in the pass band as opposed to branching filters, it is preferable to place branching filters at the output of the forward amplifiers to minimize power loss. Thus, in FIG. 1, branching filter 6 is connected to the output of forward amplifier 7. Reverse amplifier 11 amplifying the lower frequency signals ordinarily requires less gain than the higher frequency amplifiers over the same length of cable.

At terminal point 20, the problem of impedance matching may be solved by placing attenuation pads 8 and 12 in the upper and lower arms of the circuit, thus giving good impedance matching from 5 to 250 MHz.

Figure 4:
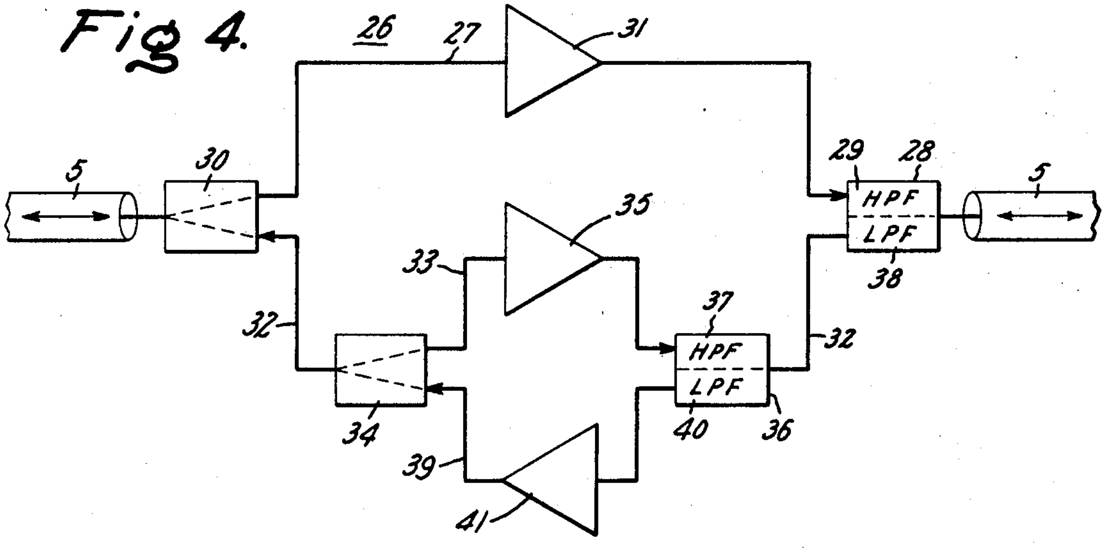
FIG. 4 is a schematic diagram of another embodiment of the present invention.

The amplifying device of our present invention may also be implemented in communication networks in which signals in more than two frequency domains are being utilized. FIG. 4 illustrates such a device, herein called a "multiplex" amplifier. Thus, multiplex amplifier 26 may, for example, be employed to amplify forward moving signals in two different frequency domains and a reverse moving signal in still another different frequency domain.

The upper or high frequency branch 27 accepts signals only in frequency domains that are able to pass through high pass filter portion 29 of branching filter 28. Thus, forward moving signals of the appropriate frequency are coupled out of coaxial cable 5 by hybrid coupler 30. The signal is amplified by forward amplifier 31 and filters through branching filter 28 back into coaxial cable 5. A second forward signal moving in a frequency domain which may be below that of the one discussed above is split out of lower branch 32 into subbranch 33 by hybrid coupler 34, is given appropriate amplification by forward amplifier 35, passes through high pass portion 37 of branching filter 36, and moves back into branch 32. The signal filters through low pass portion 38 of branch filter 28 to cable 5. A reverse moving signal in a frequency domain still lower similarly moves through subbranch 39 via low pass portion 40 of branching filter 36 and amplifier 41. Hybrid coupler 34 performs the same function for the low frequency branch as hybrid coupler 30 does for the entire amplifier.

Figure 5:
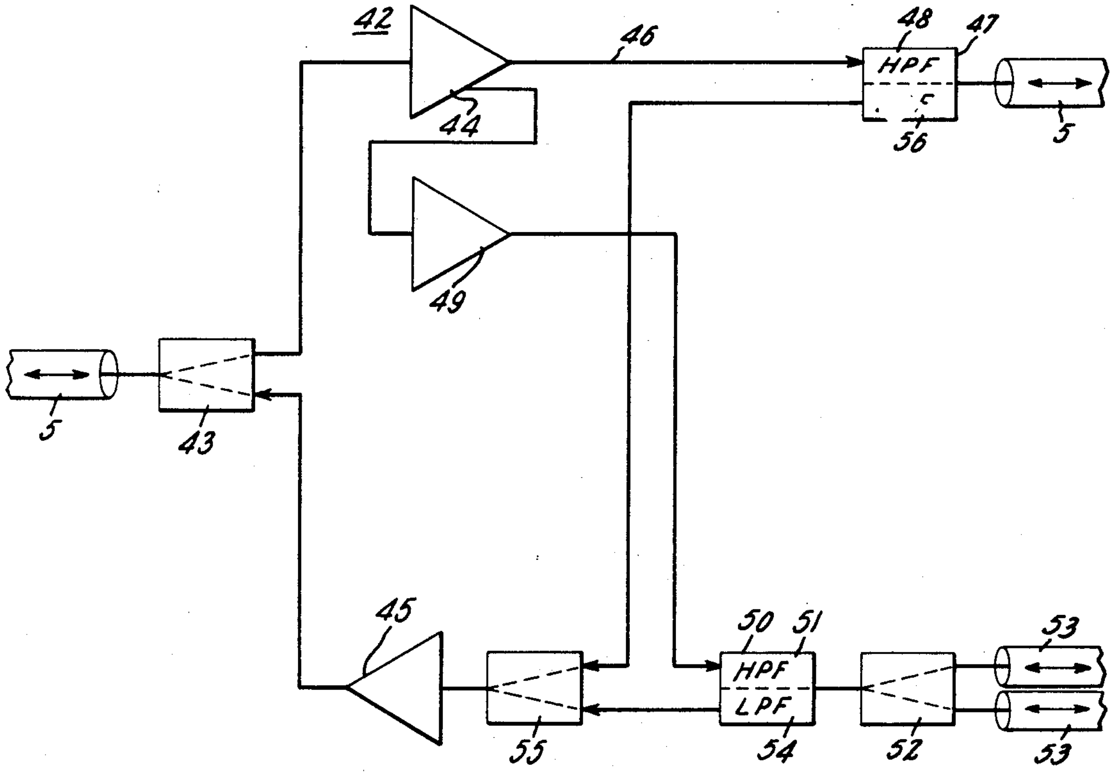
FIG. 5 is a schematic of still another embodiment of the present invention.

When the trunk coaxial cable divides into a plurality of feeder lines which service the communication response units, it is often convenient to amplify the forward and reverse signals at this junction. The embodiment of FIG. 5 discloses a two-way bridging amplifier 42 which amplifies both the continuing trunk line signals and feeder line signals.

As before, the trunk line coaxial cable 5 is coupled to hybrid coupler 43 which is connected through one terminal to trunk line amplifier 44 and through another terminal to reverse amplifier 45. Trunk line amplifier 44 forming part of upper branch 46 is connected to both high pass filter portion 48 of branching filter 47 and bridging amplifier 49. Branching filter 47 is coupled to coaxial trunk line 5 which leads to other feeder lines. Bridging amplifier 49 amplifies the forward signal into high pass filter portion 51 of branching filter 50. Hybrid coupler 52 divides the forward signal into a plurality of forward signals which move along feeder lines 53.

The reverse signals also enter into branching filter 50 through hybrid coupler 52, passing through the low pass filter portion 54, hybrid coupler 55, reverse amplifier 56, and into coaxial trunk line 5 via hybrid coupler 43. Similarly, the signals moving back along coaxial trunk line 5 pass through the low pass filter portion 56 of branching filter 47, hybrid coupler 55, reverse amplifier 45, and into coaxial trunk line 5 via hybrid coupler 43.

Thus, it is evident that the discussed embodiments of our present invention accomplish the objects of invention as outlined. The two-way amplifier device may provide amplification of signals moving both in forward and reverse directions through the same transmission line and also may provide bridging amplification to and from feeder transmission lines. It would be apparent to those skilled in the art that the components of the amplifying device of our present invention may be expanded to facilitate an increased number of signals in different frequency domains.

Therefore, while the invention has been set forth with respect to certain embodiments and examples thereof, many modifications will readily occur to those skilled in the art. Accordingly, by the appended claims, we intend to cover all such modifications and changes as fall within the true spirit and scope of the present invention.

We claim:

1. An amplifying device for amplifying signals in a plurality of frequency domains ranging up through the VHF band and moving in forward and reverse directions in a single transmission medium, said device comprising:

a plurality of amplifying branches;

directional coupling means for coupling forward moving signals into at least one of said plurality of amplifying branches and coupling reverse moving signals received from at least one of said plurality of amplifying branches into a first portion of the transmission medium;

selective frequency passing means connected to a second portion of the transmission medium ant to each of said plurality of amplifying branches, said selective frequency passing means passing signals in the higher frequency domains between at least one of said amplifying branches and the second portion of the transmission medium and passing signals in the lower frequency domains between the remaining amplifying branches and the second portion of the transmission medium; and wherein said directional coupling means and said selective frequency passing means are asymmetrically located at the ends of said amplifying branches.

2. The device of claim 1 wherein said directional coupling means provides power isolation between said plurality of amplifying branches.

3. The device of claim 1 wherein at least one of the plurality of amplifying branches has means for amplifying signals in more than one frequency domain.

4. The device of claim 1 wherein at least one of the plurality of amplifying branches has amplifying means for amplifying forward and reverse moving signals in more than one frequency domain, said amplifying means including an amplifier for each frequency domain, branch filter means for separating signals in different frequency domains, and branch directional coupling means for coupling signals into and out of said amplifying branch.

5. The device of claim 1 having two amplifying branches:

a first branch having means for amplifying forward moving signals in a first frequency domain;

a second branch having means for amplifying reverse moving signals in a second frequency domain;

said directional coupling means located at one junction of the branches; and said selective frequency passing means located at the other junction of said branches, whereby said signals in a first frequency domain travel in the first branch and the signals in said second frequency domain travel in the second branch.

6. The device of claim 5 wherein said main directional coupling means is a hybrid coupler.

7. The device of claim 5 wherein said selective frequency passing means comprises first and second branch filter means coupled to said forward and reverse moving signal amplifiers respectively, and further comprising:

a second means for amplifying forward moving signals coupled between said first branch and said second branch filter means; and second direction coupling means coupled between said first and second branch filters and said means for amplifying reverse moving signals, whereby signals moving in either direction in transmission media connected to the amplifying device are properly sorted, amplified and power isolated one from the other.

8. The device of claim 7 further comprising third directional coupler means coupled to said second branch filter means for coupling a plurality of transmission media to said second branch filter means.